United States Patent [19]
Naughton et al.

[11] Patent Number: 5,864,343
[45] Date of Patent: *Jan. 26, 1999

[54] METHOD AND APPARATUS FOR GENERATING THREE DIMENSIONAL EFFECTS IN A TWO DIMENSIONAL GRAPHICAL USER INTERFACE

[75] Inventors: Patrick J. Naughton, Palo Alto; Edward H. Frank, Portola Valey, both of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 603,689

[22] Filed: Feb. 20, 1996

Related U.S. Application Data

[63] Continuation of Ser. No. 114,655, Aug. 31, 1993, abandoned.

[51] Int. Cl.$^6$ ........................................... G06T 3/00
[52] U.S. Cl. ............................................... 345/419
[58] Field of Search .................. 395/119–124, 133–135, 395/326–327, 348–351; 345/473, 419, 327, 349, 439

[56] References Cited

U.S. PATENT DOCUMENTS

| | | | |
|---|---|---|---|
| 4,951,229 | 8/1990 | DiNicola et al. | 345/473 |
| 5,046,026 | 9/1991 | Tolomei | 345/473 |
| 5,093,907 | 3/1992 | Hwong et al. | 345/473 |
| 5,261,041 | 11/1993 | Susman | 345/473 |
| 5,315,057 | 5/1994 | Land et al. | 84/601 |
| 5,322,441 | 6/1994 | Lewis et al. | 434/307 R |
| 5,349,658 | 9/1994 | O'Rourke et al. | 345/349 |
| 5,359,703 | 10/1994 | Robertson et al. | 345/419 |
| 5,524,187 | 6/1996 | Feiner et al. | 345/419 |
| 5,524,195 | 6/1996 | Clanton III et al. | 345/327 |

OTHER PUBLICATIONS

Foley et al.; Computer Graphics: Principles and Practice; 2nd Edition; 1990; pp. 253–255, 376–381.
IBM Technical Disclosure Bulletin, vol. 20, No. 5, Oct. 1977, New York US pp. 2051–2056.
Bantz and Evangelisti "Device For Creating 3D Video Effect By Parallax" *the whole document*.

*Primary Examiner*—Anton Fetting
*Attorney, Agent, or Firm*—Finnegan, Henderson, Farabow, Garrett & Dunner, L.L.P.

[57] ABSTRACT

The graphics applications of a 2-D graphics computer system provide each object to be rendered on a 2-D raster display with a pair of rendering reference coordinates (x and y), and a relative depth value (z). Additionally, the computer system is provided with a library of predetermined 2-D images and sounds, and a number of graphics toolkit routines. As the user "moves", the graphics toolkit routines render selected ones of the predetermined images based on x/z and y/z values of recomputed x and y rendering coordinates and the relative depth value z of the objects, and actuate the sounds if applicable based on their predetermined manners of rendering. As a result, the objects that are further away from the user will move slower than the objects that are closer to the user, thereby introducing the effect of parallax and added realism to the 2-D graphics computer system at a substantially lower cost.

20 Claims, 9 Drawing Sheets

METHOD AND APPARATUS FOR GENERATING THREE DIMENSIONAL EFFECTS IN A TWO DIMENSIONAL GRAPHICAL USER INTERFACE

This is a continuation of application Ser. No. 08/114,655, filed Aug. 31, 1993, abandoned.

BACKGROUND OF THE INVENTION

1. Field of the Invention

The present invention relates to the field of computer graphics, including graphical user interfaces. More specifically, the present invention relates to a method and apparatus for rendering objects in a computer display with added realism.

2. Background

In a 3-D graphics computer system having a 2-D raster display, realistic 3-D effects are typically achieved by rendering objects on the 2-D raster display using perspective algorithms. A perspective algorithm well known in the art is the "z-divide" algorithm. Under this approach, every point of every object to be rendered has a triplet of coordinates (x, y, z) associated with it. Before the objects are rendered, the x and y coordinates of all points of all objects, are divided by their corresponding z values. The objects are then rendered by rendering all points in accordance with the computed x/z and y/z values. An example of such 3-D graphics computer systems is the Sparcstation®, manufactured by Sun Microsystems Inc., of Mountain View, Calif., embodied with the Programmer's Hierarchical Interactive Graphics System (PHIGS) (Sparcstation is a registered trademark of Sun Microsystems). The 3-D effects are realistically achieved, because the z-divides are performed for all points of all objects to be rendered, and the amount of computations, and therefore the resources in terms of CPU time and storage required, are substantial. As a result, 3-D graphics computer systems tend to be more costly than other non-three dimensional display systems.

In 2-D graphics computer systems, objects are rendered on the 2-D raster display through parallel projections. The user's eye is set at infinity. Using this approach, every object to be rendered has a pair of coordinates (x, y) associated with it. Beyond the x and y coordinates, only a "depth" order is provided for determining which object gets displayed when two objects overlap. Particular examples of such 2-D graphics computer systems include the Macintosh® computer systems, manufactured by Apple Computer, Inc. of Cupertino, Calif., and various personal computers based on the X'86 microprocessor of Intel, Inc., of Santa Clara, Calif., manufactured by IBM of Armonk, N.Y., and other vendors, embodied with the Window™ system of Microsoft, Inc. of Redmond, Wash. (Macintosh is a registered trademark of Apple Computer and Window is a trademark of Microsoft). Since there are no z-divides to be performed for every point of every object to be rendered, the amount of computations, and therefore the resources required, are substantially less. As a result, 2-D graphics computer systems tend to be relatively less expensive than their three dimensional counterparts.

However, the 3-D effects are not realistically achieved on these 2-D graphics computer systems. For example, as the user's viewpoint (location) changes, objects at different depths will move the same distance. This is not what happens in the real world, where the user will see the effect of parallax. That is, objects closer to the user will appear to move more in distance, while objects further away from the user will appear to move a little bit, if at all.

Thus, it is desirable to be able to render objects on a 2-D raster display of a 2-D graphics computer system with added realism, without requiring the amount of computations and the resources of a 3-D graphics computer system. More specifically, it is desirable to be able to introduce the parallax effect to objects rendered in a less costly manner. As will be disclosed, the present invention provides for such a method and apparatus which advantageously achieves the desired results.

SUMMARY OF THE INVENTION

Under the present invention, the desired results are advantageously achieved by having the graphics applications of a 2-D graphics computer system provide each object to be rendered on a 2-D raster display of the computer system with a pair of rendering reference coordinates (x and y), and a relative depth value (z). The x and y rendering reference coordinates and the relative depth value z of an object describe the geometric location of the object relative to the user's eye, which is set at a predetermined location.

Additionally, the 2-D graphics computer system is provided with a library of predetermined 2-D images and a number of graphics toolkit routines. The library comprises at least one predetermined 2-D image for each object to be rendered on the 2-D raster display. Each of the at least one predetermined 2-D image is the image of the object to be rendered in a display sector of the 2-D raster display. Each predetermined 2-D image has a first and a second rendering control value for controlling the rendering of the particular predetermined 2-D image in the corresponding display sector. The graphics toolkit routines cooperate with the graphic applications and the library to introduce the parallax effect to the objects being rendered.

As the user "moves" relative to the objects rendered, the graphics toolkit routines recompute the x and y rendering reference coordinates and the relative depth value z of the objects. Then the graphics toolkit routines divide the x and y rendering reference coordinates of each object by its relative depth value z. Next, the graphics toolkit routines select, for each object, a predetermined 2-D image from each object's at least one predetermined 2-D image, using the object's x/z and y/z values. Finally, the graphics toolkit routines cause the selected pre-determined 2-D images of the objects to be rendered using the objects' x/z and y/z values as the rendering controlling values.

As a result, the objects that are further away from the user will appear to move slower than the objects that are closer to the user, thereby introducing the effect of parallax and added realism to the 2-D graphics computer system. However, because the graphics toolkit routines perform the z-divides only once per object, rather than as many times as the number of points in an object to be rendered, the number of computations, and therefore the resources required, are substantially less than a 3-D graphics computer system. Thus, the added realism is achieved at a substantially lower cost.

In the presently preferred embodiment, the 2-D graphics computer system further includes a pair of stereo speakers. The library further comprises predetermined sounds for a subset of the objects. Each of these objects is provided with at least one predetermined stereo sound pair. Each of the at least one predetermined stereo sound pair describes the characteristics of the predetermined sound to be rendered in the speakers, and has a pair of left and right rendering control values.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
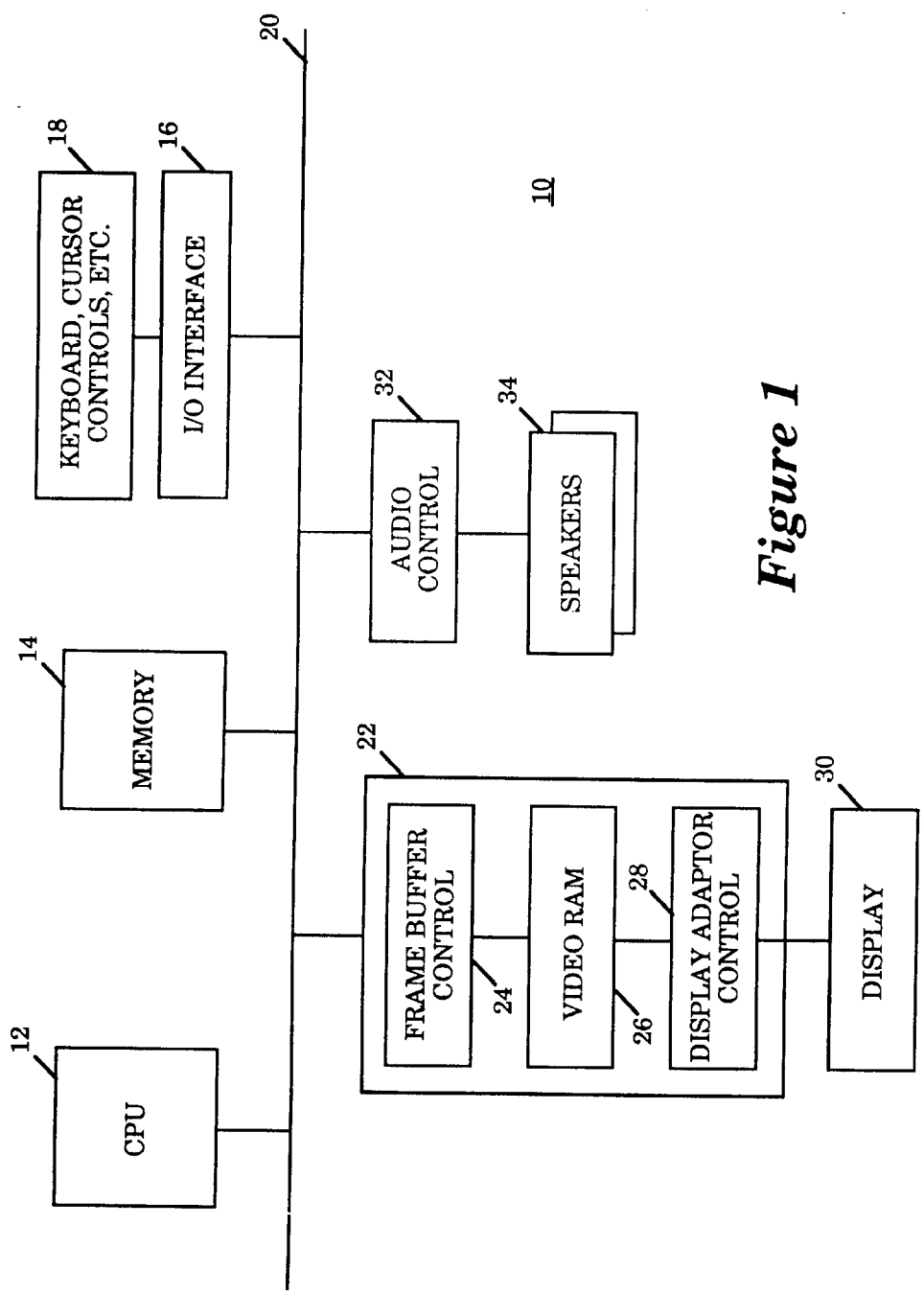
FIG. 1 is a system view of an exemplary 2-D graphics computer system incorporating the teachings of the present invention.

Referring now to FIG. 1, a system view of an exemplary 2-D graphics computer system incorporating the teachings of the present invention is shown. The exemplary 2-D graphics computer system 10 comprises a CPU 12 and a memory 14, coupled to a bus 20. The exemplary 2-D graphics computer system 10 further comprises various input devices 18, such as a keyboard and a cursor control device, a 2-D raster display 30, and a pair of speakers 34. The input devices 18 are coupled to the bus 20 through an I/O interface 16, while the 2-D raster display 30 and the speakers 34 are coupled to the bus 20 through their respective controllers, the display controller 22 and the audio controller 32. The display controller 22 includes a frame buffer control 24, a video RAM 26, and a display adapter control 28. Except for the teachings of the present invention incorporated, these elements 12–34 are intended to represent a broad category of CPUs, memory units, input devices, controllers, displays, and speakers found in many general purpose and special purpose 2-D graphics computer systems. They are well known in the art and will not be further described.

Figure 2:
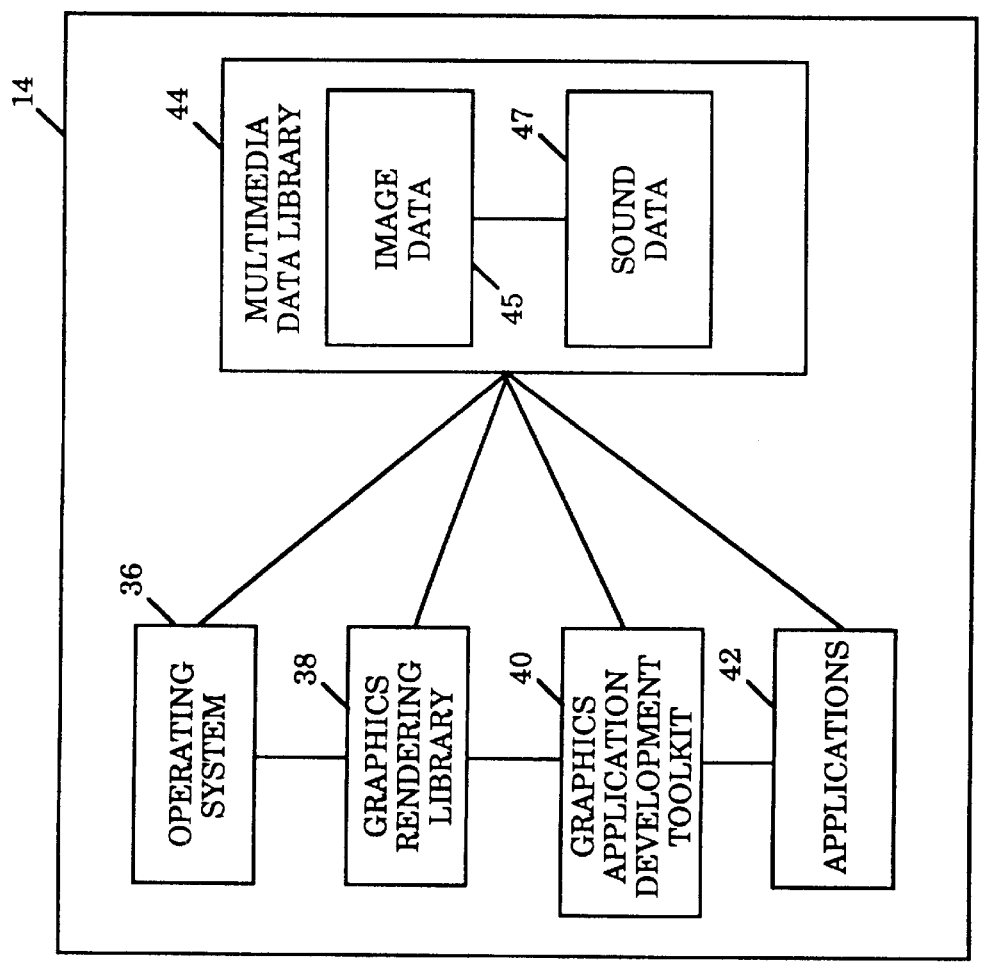
FIG. 2 is a logical view of the relevant contents of the memory of FIG. 1 in further detail.

Referring now to FIG. 2, a logical view of the relevant contents in the memory of FIG. 1 is shown. Shown is an operating system 36, a graphics rendering library 38, a graphics application development toolkit 40, and a number of graphics applications 42. The graphics application development toolkit 40 and the graphics applications 42 are incorporated with the teachings of the present invention. Also shown is a cooperative multimedia data library 44 of the present invention comprising predetermined images 45 and sounds 47. The teachings of the present invention incorporated in the graphics application development toolkit 40 and the graphics applications 42, and the cooperative multimedia data library 44 will be described in further detail below with additional references to the remaining figures. Otherwise, the elements 36–42 are well known in the art, and will not be further described.

Figure 3:
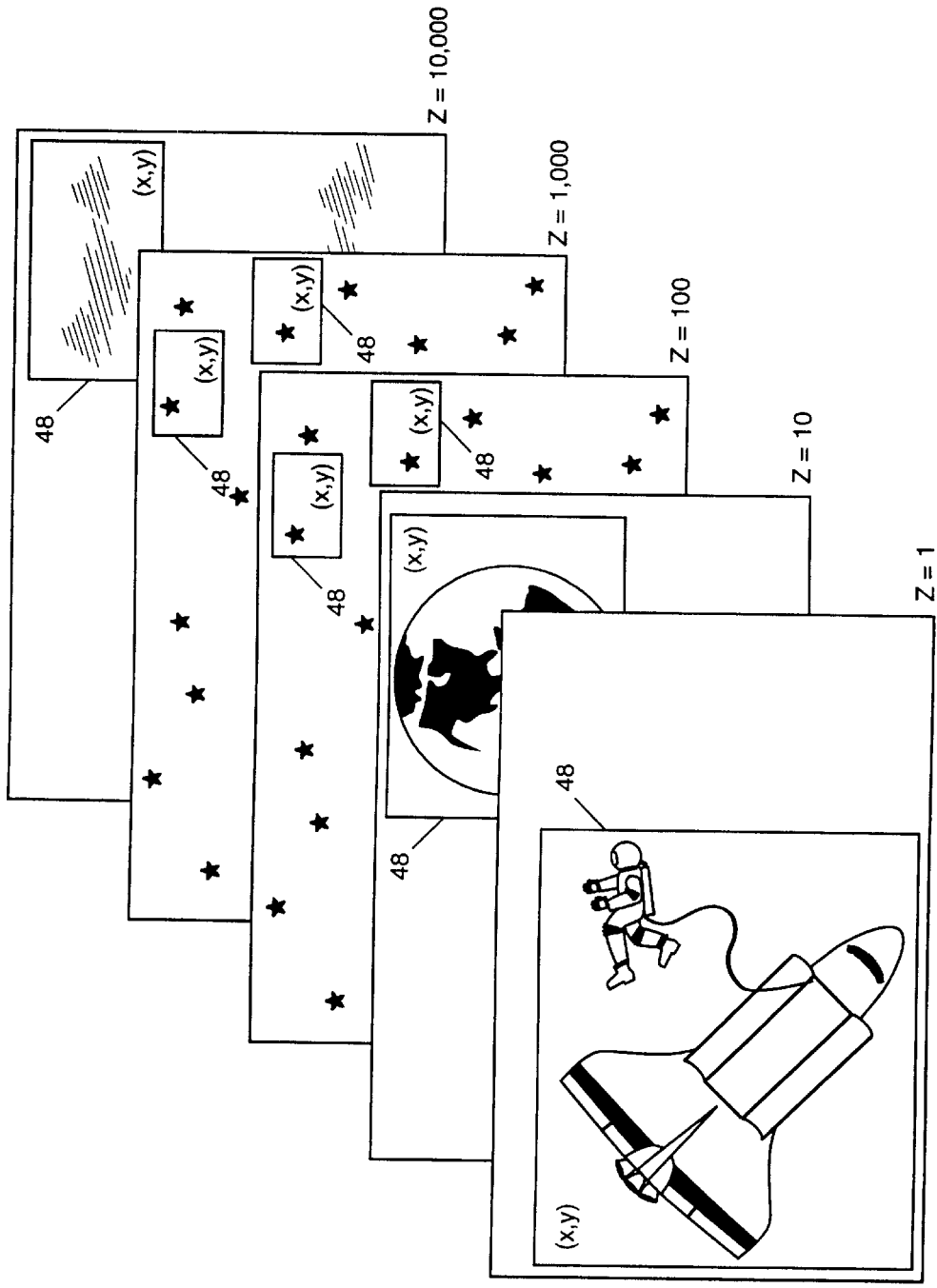
FIG. 3 is an exploded view of an exemplary screen of objects rendered on the display of FIG. 1 illustrating the teachings of the present invention incorporated in the graphics applications of FIG. 2.

Referring now to FIG. 3, an exploded view of an exemplary screen of objects rendered on the raster display of FIG. 1, illustrating the teachings of the present invention incorporated in the graphics applications of FIG. 2 is shown. The graphics applications provide and maintain a pair of rendering reference coordinates (x, y) and a relative depth value (z) for each object 48 to be rendered. The x and y rendering reference coordinates and the z relative depth values of the objects describe the geometric locations of the objects 48 relative to the user's eye, which is set at some predetermined location, for example, {(x, y)=(0, 0) and z=−10}. For the exemplary screen of objects illustrated, the first and second group of stars and the nebula are 10×, 100×, and 1000× further away from the space shuttle and astronaut than the earth. How the x and y rendering reference coordinates and the z relative depth values of the objects are used by the graphics application development toolkit routines to introduce parallax effect will be described in further detail below.

Figure 4:
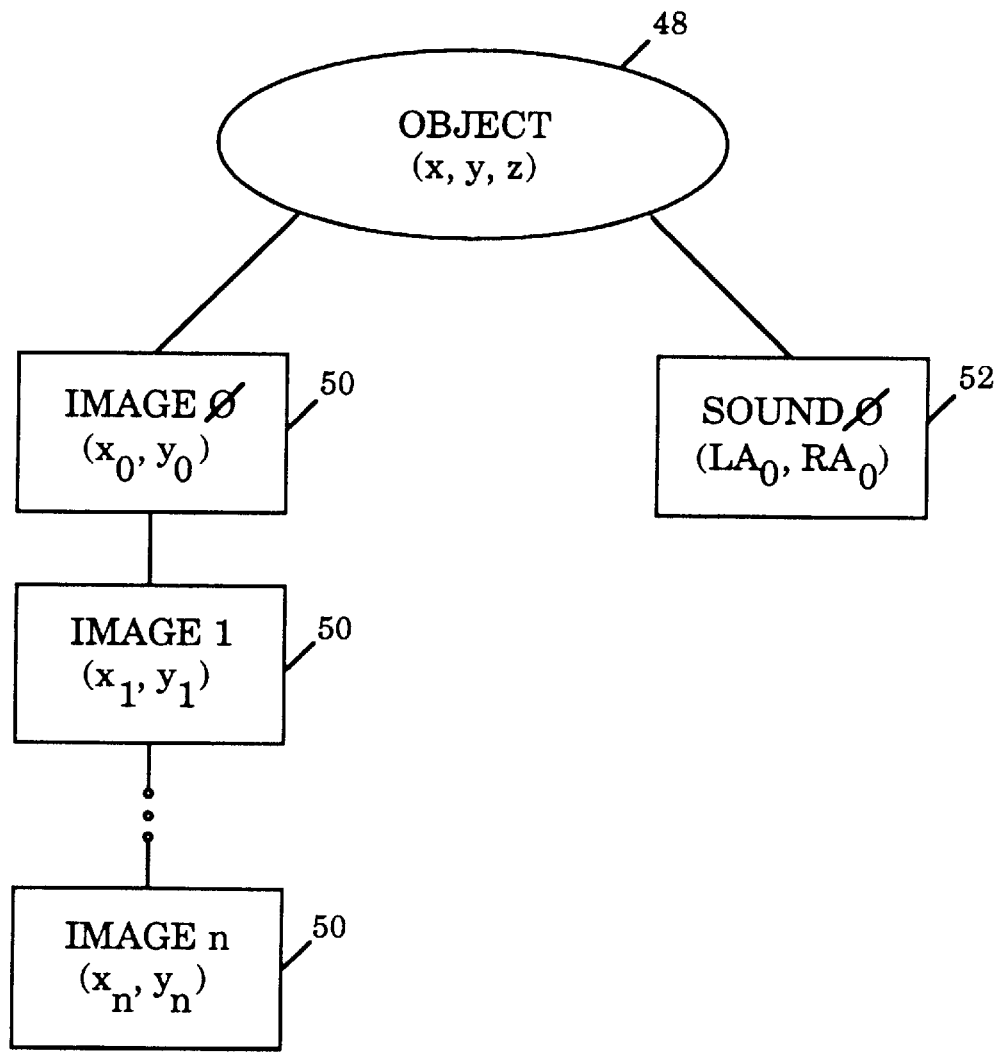
FIGS. 4–6 illustrate the relevant contents of the library of predetermined 2-D images and sounds of FIG. 2 in further detail.
Figure 5:
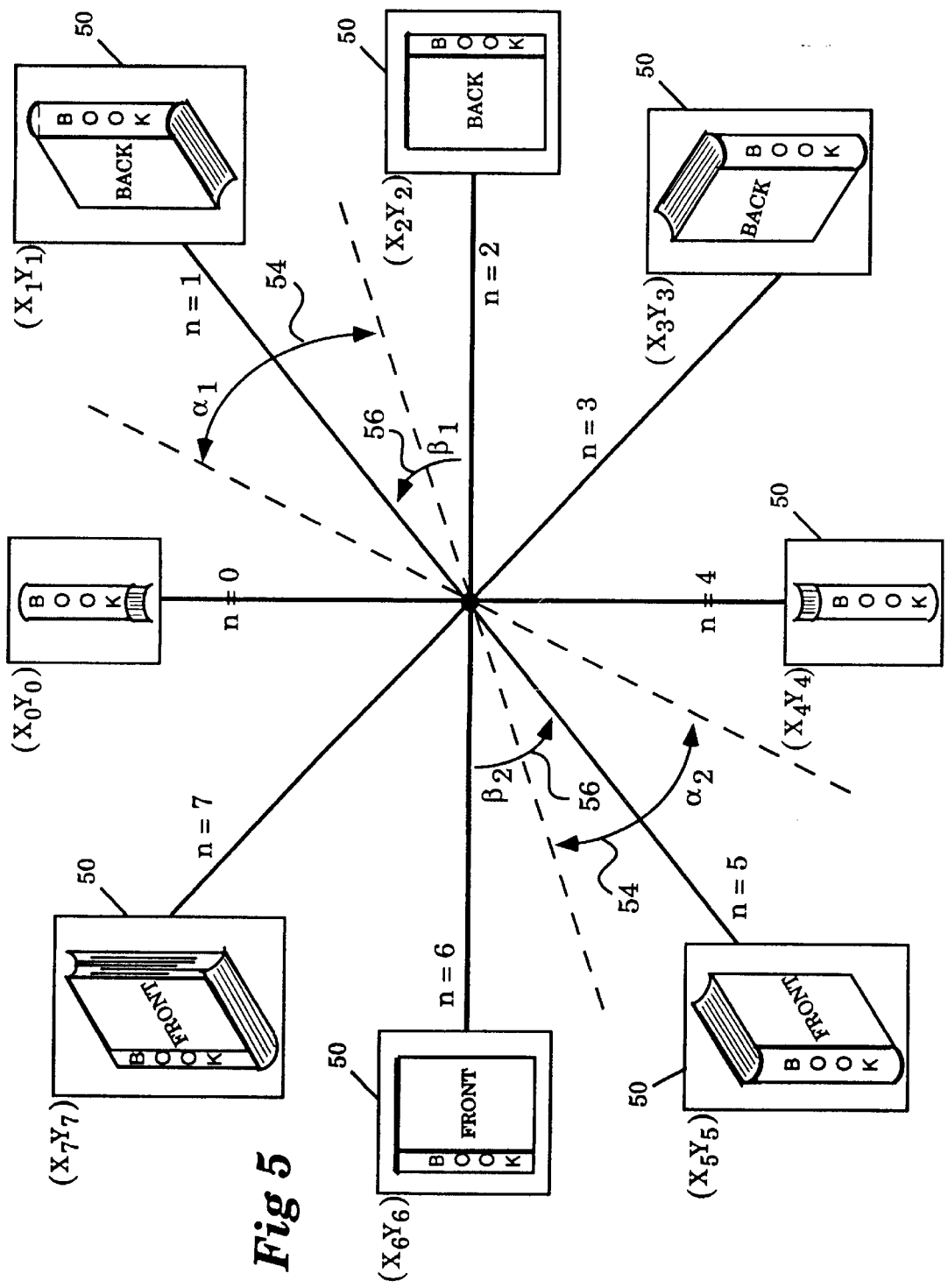
Figure 6:
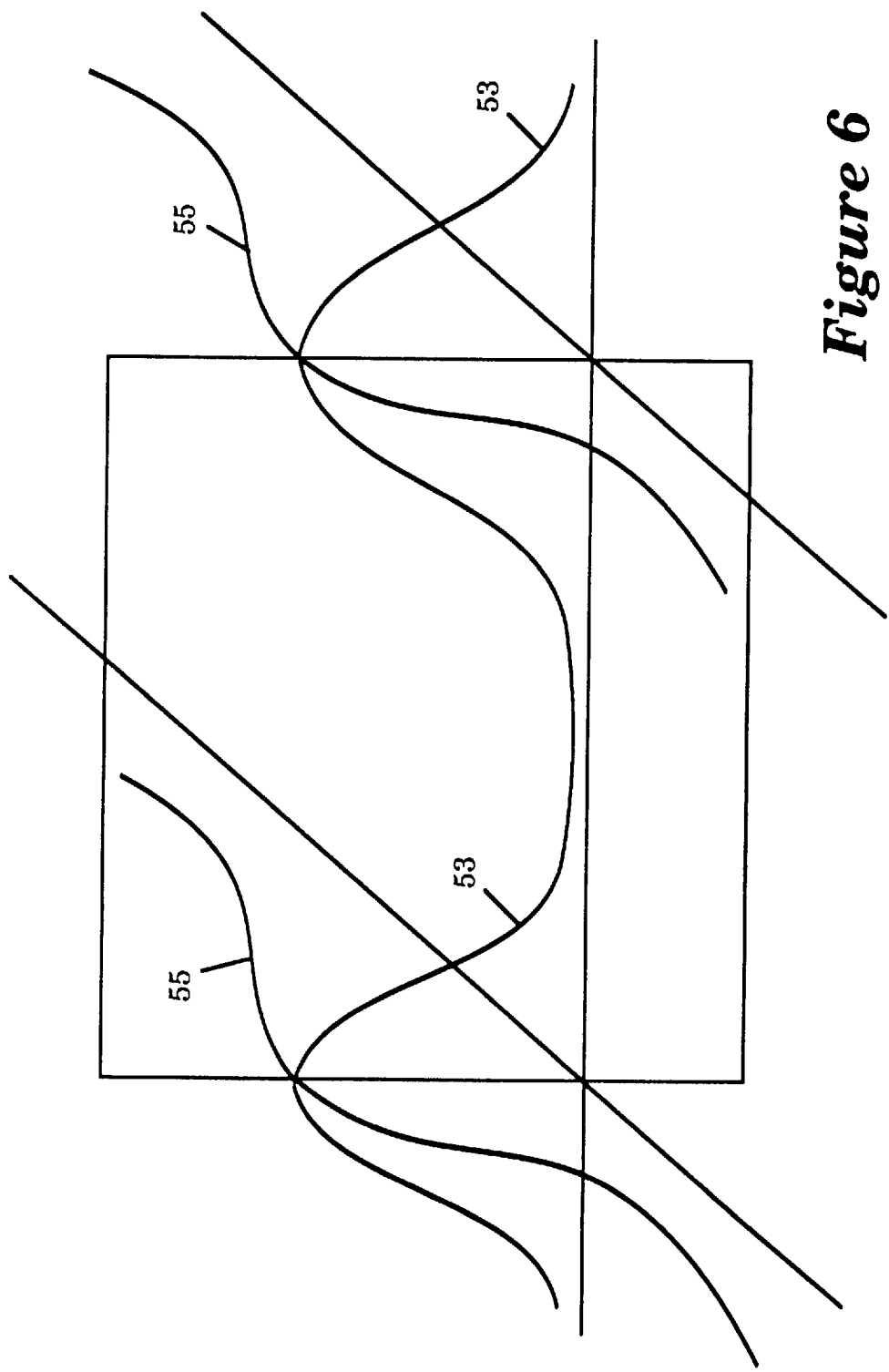

Referring now to FIGS. 4–6, three diagrams illustrating the relevant contents of the multimedia data library of FIG. 2 in further detail are shown. As illustrated in FIG. 4, the multimedia data library comprises at least one predetermined 2-D image 50 for each object 48. Each predetermined 2-D image 50 is the 2-D image of an object to be rendered in a display sector of the raster display. Each predetermined 2-D image 50 is defined by a first and a second rendering control value.

For example, as illustrated in FIG. 5, the multimedia data library provides for eight predetermined 2-D images 50 for an exemplary "book" object. Each predetermined 2-D image 50 is the 2-D image of the "book" object to be rendered in a display sector of the raster display. The second predetermined 2-D image 50a (n=1) is to be rendered in the display sector bounded by the line segments forming the angle a1, whereas the sixth predetermined 2-D image 50a (n=5) is to be rendered in the display sector bounded by the line segments forming the angle a2. Each predetermined 2-D image 50a is defined by the geometric position of the top left corner of the predetermined 2-D image, i.e. the x and y coordinates of the top left corner.

While the present invention is being illustrated with the exemplary "book" object having eight predetermined 2-D images for eight display sectors partitioned by line segments radiating from the center of the display, and each predetermined 2-D image being defined by the geometric location of its top left corner, it will be appreciated that the present invention may be practiced with objects being provided with one or more predetermined 2-D images corresponding to one or more display sectors partitioned in any number of manners, and each predetermined 2-D image being defined with any number of controlling references.

As illustrated in FIG. 4, preferably, the multimedia data library further comprises at least one predetermined sound 52 for a subset of the objects 48. Each predetermined stereo sound pair 52 of an object 48 describes the characteristics of the predetermined sound to be rendered in the speakers, and has a pair of left and right rendering control values.

For example, as illustrated in FIG. 6, the multimedia data library provides for a predetermined "buzzing" sound pair for an exemplary "bee" object. The predetermined "buzzing" sound pair describes the amplitude of "buzzing" to be rendered in the speakers, and the amplitude of "buzzing" is given by $$LA(x,z) = \left\{ \frac{\left(\frac{w}{z}\right) - x}{\left(\frac{w}{z}\right)} \times \frac{z_d - z}{z_d} \right\}^2$$

$$RA(-x,z) = LA(x,z)$$

where x is the x-coordinate of a reference point of the "bee" object, z is the depth value of the "bee" object, w is the width of the display screen, and $z_d$ is the deepest depth value of all objects currently being rendered on the display screen.

The amplitude of "buzzing" is maximized when the exemplary "bee" object is closest to the user at either the left or right edge of the display screen. The amplitude of "buzzing" decreases as the exemplary "bee" object moves away from the user and/or away from the either edge of the display screen.

While the present invention is being illustrated with the exemplary "bee" object having one predetermined sound pair describing the amplitude of "buzzing", and the amplitude of "buzzing" being given by the x-coordinate of a reference point, the depth value of the "bee" object, the width of the display screen and the depth value of the deepest object, it will be appreciated that the present invention may be practiced with objects being provided with one or more predetermined sound pairs describing one or more sound characteristics, and each predetermined sound pair being defined with any number of rendering controlling values.

Figure 7:
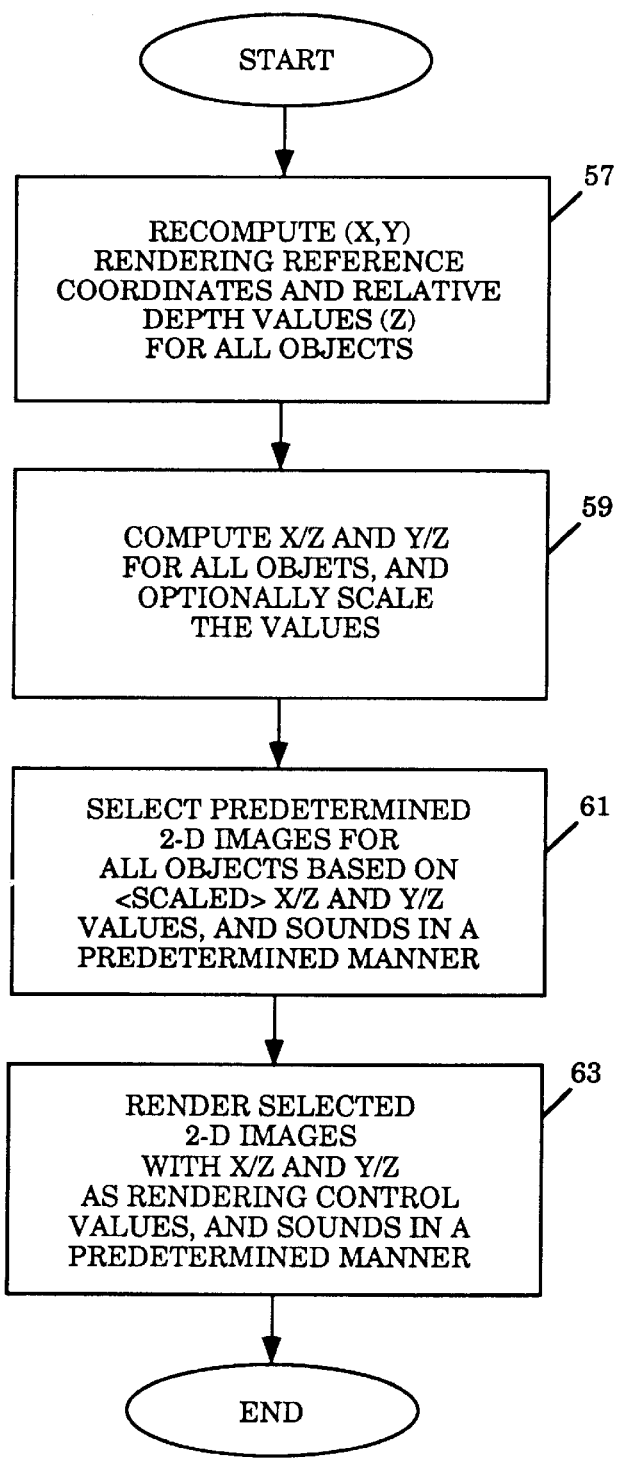
FIG. 7 illustrates the operational flow of the relevant graphics toolkit routines of FIG. 2 for introducing the effect of parallax to objects.

Referring now to FIG. 7, a block diagram illustrating the operational flow of the relevant graphics application development toolkit routines is shown. As the user "moves" relative to the objects rendered, the relevant graphics application development toolkit routines recompute the x and y rendering reference coordinates and the z relative depth values for all objects, block 57. Then the routines divide the x and y rendering reference coordinates of each object by its z relative depth value, block 59. Preferably, the x/z and y/z values are then scaled by a scale factor, block 59. The scaling factor is used to minimize or exaggerate the object's differences in relative depth. Next, the routines select a predetermined 2-D image for each object, and if applicable, a predetermined sound pair, block 61. The predetermined 2-D image is selected based on the unscaled or scaled x/z and y/z values, whereas the predetermined sound pair is selected in an application dependent predetermined manner. Finally, the routines cause the selected images and sound pairs to be rendered block 63. The predetermined 2-D images are rendered in the corresponding display sectors with the scaled or unscaled x/z and y/z values as their rendering control values, and the selected sound pairs are rendered at the speakers in an application dependent predetermined manner.

Figure 8A:
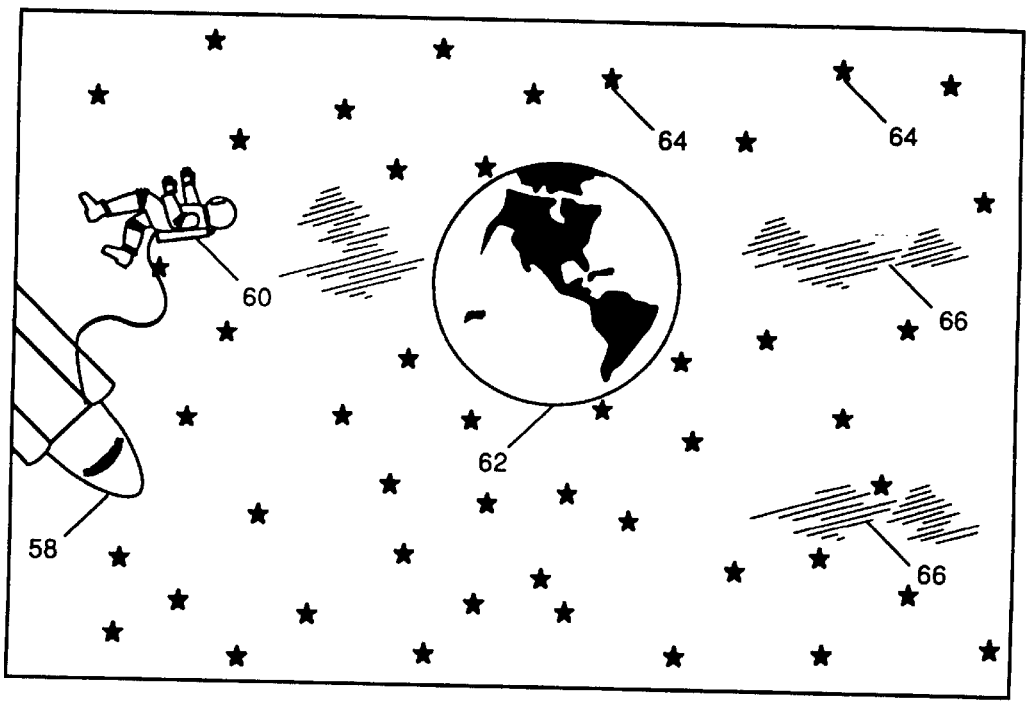
FIGS. 8a–8d illustrate the parallax effect introduced to the objects by the present invention.
Figure 8B:
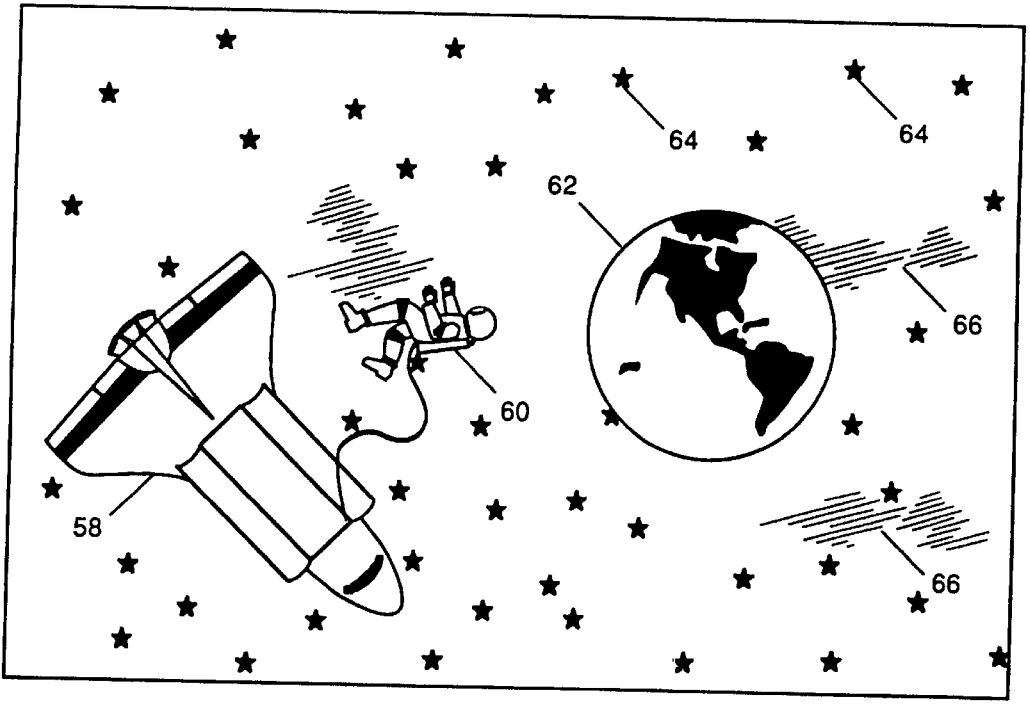
Figure 8C:
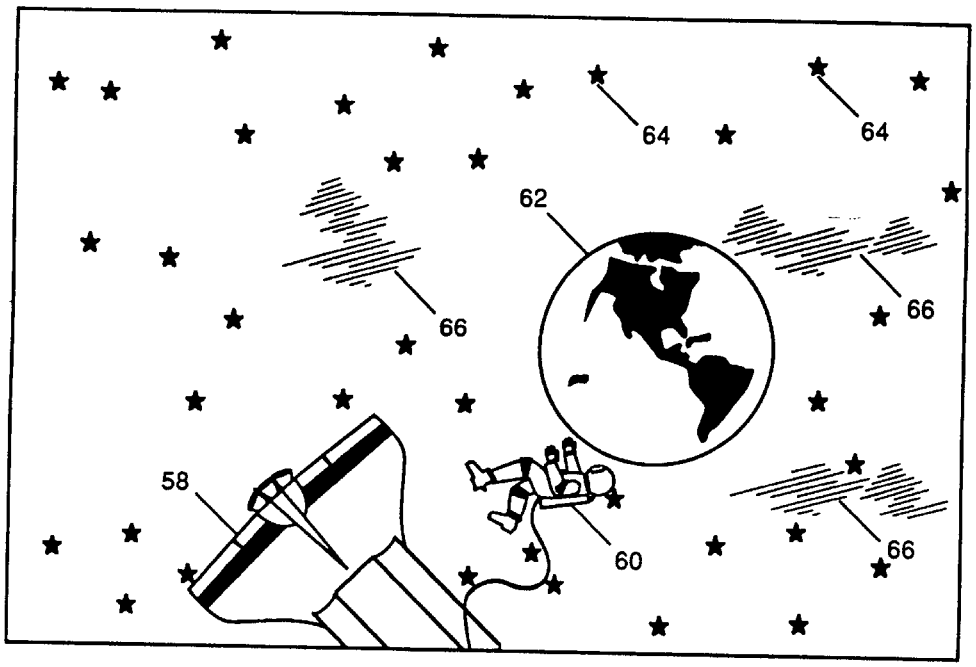
Figure 8D:
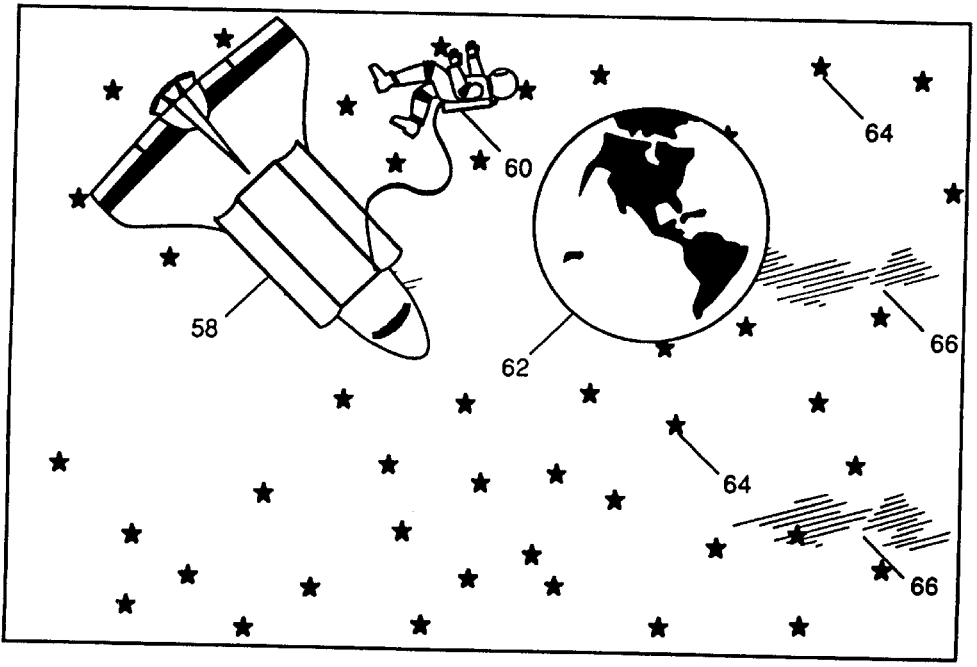

Since the selected images are rendered using the scaled or unscaled x/z and y/z values as their rendering control values, the objects further away from the user will move slower than the objects closer to the user, as illustrated by FIGS. 8a–8d, thereby introducing the effect of parallax to the objects rendered. FIGS. 8a–8b illustrate the effect of parallax for horizontal movement, while FIGS. 8c–8d illustrate the effect of parallax for vertical movement. In both cases, the space shuttle and the astronaut, which are closest to the user, will appear to have moved the most, while the earth, the various stars, and the nebula, which are further away from the user, will appear to have moved progressively less. Scaling is employed to make the nebula appear to have moved a little bit for the user, thereby increasing the dramatic effect of the graphics. In the real world, because the nebula are so far away, the user will not perceive any movement. Since the z divides are performed only once per object, and not for every point of every object, the amount of computations and therefore the resources required in the exemplary 2-D graphics computer system are substantially less. As a result, the effect of parallax and added realism are achieved in substantially lower cost.

While FIGS. 8a–8d illustrate the effect of parallax using a space related graphics application, it will be appreciated that the present invention may be practiced with any user interfaces, including but not limited to an interface where the objects represent different units of time, with the smaller units such as nanoseconds and seconds being closer to the user, and the larger units such as years, centuries, and millennia being farther away from the user, or an interface where the objects represent the elements of an hierarchical system with the younger offspring being closer to the user, and the older ancestors being farther away from the user, or an interface where the objects represent the elements of a book, with the paragraphs and sections being closer to the user, and the chapters and parts being farther away from the user.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative of, and not limiting the scope of the present invention.

What is claimed is:

1. In a computer system comprising a raster display, a method for generating and displaying at least two objects at different depths on said raster display with added realism, said method comprising the steps of:

storing at least one predetermined 2-D image for each of said objects, each of said at least one predetermined 2-D image of said objects corresponding to the image of one of said objects to be rendered in a display sector of said raster display, each of said at least one predetermined 2-D image of said objects being defined based on a first and a second image rendering control value;

computing a pair of x and y rendering reference coordinates and a relative depth value (z) for each of said objects, said x and y rendering reference coordinates and said z relative depth values of said objects describing geometric locations of said objects relative to a user's eye set at a predetermined location;

computing a transformed set of coordinates by dividing said pair of x and y rendering reference coordinates by a function of (f(z)) of said z values to generate a parallax effect between said at least two objects;

multiplying the transformed set of coordinates by a selected factor to enhance the parallax effect;

selecting a predetermined 2-D image for each of said objects based on the object's transformed set of coordinates; and rendering said objects on said raster display using said selected 2-D images, said first and second image rendering control values of said selected 2-D images being determined using said transformed set of coordinates.

2. The method as set forth in claim 1, wherein, eight predetermined 2-D images corresponding to eight display sectors are stored for a first of said objects, one for each of said eight display sectors, each said display sectors being bounded by a first and a second line segment radiating from a center of said raster display forming an angle of a predetermined size; and said selection of a predetermined 2-D image for said first object in said step of selecting a predetermined image comprises selecting one of the eight predetermined 2-D images.

3. The method as set forth in claim 1, wherein said function in said step of computing a transformed set of coordinates is $f(z)=z$.

4. The method as set forth in claim 3, wherein, each of said at least one predetermined 2-D images has a rendering control point;

said first and second image rendering control values of said predetermined 2-D images are x and y coordinates of said rendering control points of said selected 2-D images to said transformed set of coordinates.

5. The method as set forth in claim 4, wherein said rendering control points of said at least one predetermined 2-D images are geometric top left corners of said predetermined 2-D images.

6. The method as set forth in claim 1, wherein, said computer system further comprises at least one speaker;

said step of storing at least one predetermined 2-D image further comprises storing at least one predetermined sound for each member of a subset of said objects, each of said at least one predetermined sound of said member objects describing the frequency of the sound to be rendered, and having a predetermined manner of rendering;

said step of selecting a predetermined 2-D image further comprises selecting a predetermined sound for each of said member objects in a predetermined manner; and said step of rendering said objects on said raster display further comprises actuating said at least one speaker using said selected sounds, said selected sounds being rendered in accordance to their predetermined manners of rendering.

7. The method as set forth in claim 6, wherein, said computer system comprises two speakers, a left and a right speaker;

a predetermined sound describing an amplitude characteristic of the sound is stored for a second of said objects, said predetermined sound having a left and a right rendering control values (LA and RA) given by a first and a second equation, said first and second equations being $$LA(x,z) = \left\{ \frac{\left(\frac{w}{z}\right) - x}{\left(\frac{w}{z}\right)} \times \frac{z_d - z}{z_d} \right\}^2$$

$$RA(-x,z) = LA(x,z)$$

where x is the x-coordinate of a reference point of said second object, z is the depth value of said second object, w is a screen width of said display, and $z_d$ is the deepest depth value of all objects currently being rendered on said display.

8. The method as set forth in claim 1, where said objects are elements of the user interface of an application and represent entities which a user of said computer system views and manipulates through the user interface of said application.

9. The method as set forth in claim 8, wherein said entities represented by said objects are members of a multilevel hierarchical system comprising a plurality of ancestors and offspring, said offspring being represented by objects closer to said user's eye, and said ancestors being represented by objects farther away from said user's eye.

10. The method of claim 8, where said entities represented by said objects are parts, chapters, sections, and paragraphs of a book, said paragraphs and sections being represented by objects closer to said user's eye, and said parts and chapters being represented by objects farther away from said user's eye.

11. In a computer system comprising a raster display, an apparatus for generating and displaying at least two objects at different depths on said raster display with added realism, said apparatus comprising:

storage means for storing at least one predetermined 2-D image for each of said objects, each of said at least one predetermined 2-D image of said objects corresponding to the image of one of said objects to be rendered in a display sector of said raster display, each of said at least one predetermined 2-D image of said objects being defined based on a first and a second image rendering control value;

computation means for computing a pair of x and y rendering reference coordinates and a relative depth value (z) for each of said objects, said x and y rendering reference coordinates and said z relative depth values of said objects describing geometric locations of said objects relative to a user's eye set at a predetermined location;

transformation means coupled to said computation means for computing a transformed set of coordinates by dividing said pair of x and y rendering reference coordinates by a function (f(z)) of said z value to generate a parallax effect between said at least two objects;

means for modifying the transformed set of coordinates by a selected factor to enhance the parallax effect;

selection means coupled to said storage means and said adjustment means for selecting a predetermined 2-D image for each of said objects based on said transformed set of coordinates; and rendering means coupled to said selection means for rendering said objects on said raster display using said selected 2-D images, said first and second image rendering control values of said selected 2-D images being determined using said transformed set of coordinates.

12. The apparatus as set forth in claim 11, wherein, said storage means stores eight predetermined 2-D images corresponding to eight display sectors for a first of said objects, one for each of said eight display sectors, each of said display sectors being bounded by a first and a second line segment radiating from a center forming an angle of a predetermined size; and said selection means selects one of the eight predetermined 2-D images as the predetermined 2-D image to be rendered for said first object.

13. The apparatus as set forth in claim 11, wherein said function is f(z)=z.

14. The apparatus as set forth in claim 13, wherein, each of said at least one predetermined 2-D images has a rendering control point;

said first and second image rendering control values of said predetermined 2-D images are x and y display coordinates of said rendering control points of said predetermined 2-D images; and said determination means determines said first and second image rendering control values of said selected 2-D images by setting said x and y display coordinates of said rendering control points of said selected 2-D images to said transformed set of coordinates.

15. The apparatus as set forth in claim 14, wherein said rendering control points of said predetermined 2-D images are geometric top left corners of said at least one predetermined 2-D images.

16. The apparatus as set forth in claim 11, wherein, said computer system further comprises at least one speaker;

said storage means further stores at least one predetermined sound for each member of a subset of said objects, each of said at least one predetermined sound of said member objects describing the frequency of the sound to be rendered, and having a predetermined manner of rendering;

said selection means further selects a predetermined sound for each of said member objects in a predetermined manner; and said rendering means further actuates said at least one speaker using said selected sounds, said selected sounds be rendered in accordance to their predetermined manner of rendering.

17. The apparatus as set forth in claim 16, wherein, said computer system comprises two speakers, a left and a right speaker;

a predetermined sound describing an amplitude characteristic of the sound is stored for a second of said objects, said predetermined sound having a left and a right rendering control values (LA and RA) given by a first and a second equation, said first and second equations being $$LA(x,z) = \left\{ \frac{\left(\frac{w}{z}\right) - x}{\left(\frac{w}{z}\right)} \times \frac{z_d - z}{z_d} \right\}^2$$

-continued $$RA(-x,z) = LA(x,z)$$

where x is the x-coordinate of a reference point of said second object, z is the depth value of said second object, w is a screen width of said display, and $z_d$ is the deepest depth value of all objects currently being rendered on said display.

18. The apparatus as set forth in claim 11, wherein said objects are elements of the user interface of an application and represent entities which a user of said computer system views and manipulates through the user interface of said application.

19. The apparatus as set forth in claim 18, wherein said entities represented by said objects are members of a multilevel hierarchical system comprising a plurality of ancestors and offspring, said offspring being represented by objects closer to said user's eye, and said ancestors being represented by objects farther away from said user's eye.

20. The apparatus of claim 18, where said entities represented by said objects are parts, chapters, sections, and paragraphs of a book, said paragraphs and sections being represented by objects closer to said user's eye, and said parts and chapters being represented by objects farther away from said user's eye.

* * * * *